United States Patent
Yoo et al.

(10) Patent No.: US 11,544,497 B2
(45) Date of Patent: *Jan. 3, 2023

(54) METHOD AND APPARATUS FOR RECOGNIZING OBJECT, AND METHOD AND APPARATUS FOR TRAINING RECOGNITION MODEL

(71) Applicant: Samsung Electronics Co., Ltd., Suwon-si (KR)

(72) Inventors: Byungin Yoo, Seoul (KR); Youngjun Kwak, Seoul (KR); Jungbae Kim, Seoul (KR); Seon Min Rhee, Seoul (KR); Seungju Han, Seoul (KR); Jaejoon Han, Seoul (KR); Wonjun Hwang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 77 days.

This patent is subject to a terminal disclaimer.

(21) Appl. No.: 17/101,552

(22) Filed: Nov. 23, 2020

(65) Prior Publication Data

US 2021/0073582 A1 Mar. 11, 2021

Related U.S. Application Data

(63) Continuation of application No. 15/347,143, filed on Nov. 9, 2016, now Pat. No. 10,860,887.

(30) Foreign Application Priority Data

Nov. 16, 2015 (KR) .................. 10-2015-0160481
Jul. 5, 2016 (KR) .................. 10-2016-0084932

(51) Int. Cl.
*G06K 9/62* (2022.01)
*G06V 10/44* (2022.01)
(Continued)

(52) U.S. Cl.
CPC ............ *G06K 9/6256* (2013.01); *G06N 3/08* (2013.01); *G06V 10/451* (2022.01);
(Continued)

(58) Field of Classification Search
CPC .... G06N 3/08; G06V 40/168; G06V 40/1365; G06V 40/172; G06V 40/16;
(Continued)

(56) References Cited

U.S. PATENT DOCUMENTS 5,982,912 A * 11/1999 Fukui ..................... G06V 40/16
382/118
7,274,819 B2 * 9/2007 Matsugu .............. G06V 10/454
382/181

(Continued)

FOREIGN PATENT DOCUMENTS

| CN | 1908960 A | 2/2007 |
| CN | 101334839 A | 12/2008 |
| JP | 4556891 B2 | 10/2010 |

OTHER PUBLICATIONS

"Deep Learning Face Representation from Predicting 10,000 Classes," Computer Vision and Pattern Recognition.
(Continued)

*Primary Examiner* — Shaghayegh Azima
(74) *Attorney, Agent, or Firm* — Harness, Dickey & Pierce, P.L.C.

(57) ABSTRACT

A method and an apparatus for recognizing an object are disclosed. The apparatus may extract a plurality of features from an input image using a single recognition model and recognize an object in the input image based on the extracted features. The single recognition model may include at least one compression layer configured to compress input infor-
(Continued)

mation and at least one decompression layer configured to decompress the compressed information to determine the features.

20 Claims, 20 Drawing Sheets

(51) Int. Cl.
    *G06V 40/16*   (2022.01)
    *G06V 40/12*   (2022.01)
    *G06N 3/08*    (2006.01)
    *H04L 9/40*    (2022.01)
(52) U.S. Cl.
    CPC ...... *G06V 40/1347* (2022.01); *G06V 40/1365* (2022.01); *G06V 40/16* (2022.01); *G06V 40/168* (2022.01); *G06V 40/172* (2022.01); *H04L 63/0861* (2013.01)
(58) Field of Classification Search
    CPC ............ G06V 10/451; G06V 40/1347; G06K 9/6256; H04L 63/0861
    See application file for complete search history.

(56) References Cited

U.S. PATENT DOCUMENTS

| | | | |
|---|---|---|---|
| 8,582,807 B2 | 11/2013 | Yang et al. | |
| 8,712,109 B2* | 4/2014 | Hua | G06V 40/171 382/118 |
| 9,530,047 B1* | 12/2016 | Tang | G06V 40/172 |
| 9,569,700 B1* | 2/2017 | Santos | G06V 10/454 |
| 9,928,410 B2* | 3/2018 | Yoo | G06V 40/171 |
| 2003/0063781 A1 | 4/2003 | Philomin et al. | |
| 2005/0105805 A1* | 5/2005 | Nicponski | G06V 10/757 382/216 |
| 2005/0201594 A1* | 9/2005 | Mori | G09B 19/00 348/136 |
| 2006/0115157 A1* | 6/2006 | Mori | G06V 40/174 382/118 |
| 2007/0244842 A1* | 10/2007 | Ishii | G06N 3/04 706/18 |
| 2008/0039960 A1* | 2/2008 | Kadir | G06K 9/6217 700/73 |
| 2008/0201282 A1* | 8/2008 | Garcia | G06V 40/171 706/20 |
| 2010/0007665 A1* | 1/2010 | Smith | G06T 13/40 345/473 |
| 2010/0284577 A1* | 11/2010 | Hua | G06V 40/171 382/118 |
| 2011/0081089 A1* | 4/2011 | Mori | G06V 40/171 382/218 |
| 2011/0091071 A1* | 4/2011 | Sabe | G06V 40/172 382/103 |
| 2011/0103695 A1* | 5/2011 | Sato | G06V 10/774 382/190 |
| 2011/0142298 A1* | 6/2011 | Akbarzadeh | G06V 10/758 382/218 |
| 2011/0243461 A1* | 10/2011 | Nayar | G06V 40/171 382/224 |
| 2011/0274315 A1* | 11/2011 | Fan | G06T 7/277 382/103 |
| 2012/0281887 A1* | 11/2012 | Yamaguchi | G06F 16/5838 382/118 |
| 2013/0148860 A1* | 6/2013 | Musatenko | G06V 10/754 382/107 |
| 2013/0243274 A1* | 9/2013 | Sukegawa | G06V 40/16 382/118 |
| 2014/0003663 A1* | 1/2014 | Li | G06V 40/161 382/103 |
| 2014/0003664 A1* | 1/2014 | Umezaki | G06T 7/248 382/103 |
| 2014/0071308 A1* | 3/2014 | Cieplinski | G06T 11/203 348/222.1 |
| 2014/0089236 A1* | 3/2014 | Lee | G06V 10/774 706/12 |
| 2014/0219526 A1* | 8/2014 | Linguraru | G06V 40/16 382/128 |
| 2015/0139485 A1* | 5/2015 | Bourdev | G06K 9/6292 382/103 |
| 2015/0199963 A1* | 7/2015 | Maaninen | G10L 15/16 704/232 |
| 2015/0302252 A1* | 10/2015 | Herrera | G06V 40/70 382/117 |
| 2015/0374306 A1* | 12/2015 | Gelbman | G06V 40/174 600/476 |
| 2015/0381939 A1* | 12/2015 | Cunico | G06V 40/171 348/14.07 |
| 2016/0019454 A1* | 1/2016 | LaRue | G06N 3/08 706/25 |
| 2016/0065861 A1* | 3/2016 | Steinberg | G06V 40/168 348/239 |
| 2016/0125228 A1* | 5/2016 | Son | A61B 5/1176 382/118 |
| 2016/0125572 A1* | 5/2016 | Yoo | G06K 9/6255 382/157 |
| 2016/0148080 A1* | 5/2016 | Yoo | G06N 3/0454 382/118 |
| 2016/0171346 A1* | 6/2016 | Han | G06V 10/454 382/156 |
| 2016/0328647 A1* | 11/2016 | Lin | G06F 17/11 |
| 2017/0147868 A1* | 5/2017 | Sun | G06K 9/6215 |
| 2017/0304732 A1* | 10/2017 | Velic | G06V 20/66 |
| 2018/0330178 A1* | 11/2018 | el Kaliouby | A61B 5/1079 |

OTHER PUBLICATIONS

"SEXNET: A neural network identifies sex from human faces," Advances in Neural Information Processing Systems 3, 1991.
"Learning Deep Face Representation," arXiv:1403.2802v1, Mar. 12, 2014.
"Joint Feature Learning for Face Recognition," Information Forensics and Security, 2015, vol. 10, Issue 7.
"Multi-column Deep Neural Networks for Image Classification," CVPR '12 Proceedings of the 2012 IEEE Conference on Computer Vision and Pattern Recognition (CVPR).
Extended European Search Report dated Mar. 24, 2017.
Bishop, C.M., "Chapter 5—Neural Networks," Pattern Recognition and Machine Learning, pp. 226-290, Jan. 1, 2006.
Rowley, H.A., et al., "Neural Network-Based Face Detection," IEEE Transactions on Pattern Analysis and Machine Intelligence, vol. 20, No. 1, pp. 23-38, Jan. 1, 1998.
Lawrence, S. et al., "Face recognition: A Convolutional Neural-Network Approach," IEEE Transactions on Neural Networks, pp. 98-11, Jan. 1, 1997.
European Office Action dated Mar. 10, 2020.
Garcia, C., et al., "A Neural Architecture for Fast and Robust Face Detection," IEEE, 2002.
Matsugu, M. et al., "Convolutional spiking neural network model for robust face detection," Proceedings of the 9th International Conference on Neural Information Processing, vol. 2, pp. 660-664, 2002.
Chinese Office Action and English translation thereof dated Jun. 2, 2021.

* cited by examiner

METHOD AND APPARATUS FOR RECOGNIZING OBJECT, AND METHOD AND APPARATUS FOR TRAINING RECOGNITION MODEL

CROSS-REFERENCE TO RELATED APPLICATION

This application is a continuation of and claims priority under 35 U.S.C. § 120 to U.S. application Ser. No. 15/347,143, filed Nov. 9, 2016, which claims priority under 35 U.S.C. § 119 to Korean Patent Application No. 10-2015-0160481 filed on Nov. 16, 2015, and Korean Patent Application No. 10-2016-0084932 filed on Jul. 5, 2016, in the Korean Intellectual Property Office, the entire contents of each of which are incorporated herein by reference in their entirety.

BACKGROUND

1. Field

At least one example embodiment relates to a method and/or an apparatus for recognizing an object, and a method and/or an apparatus for training a recognition model.

2. Description of the Related Art

A recognition model that may perform user authentication using a face or a fingerprint of a user is designed based on an artificial neural network that is modeled on biological characteristics of human neurons using mathematical representations. The artificial neural network may be used to output a recognition result corresponding to an input pattern of input information, and configured to generate a map between an input pattern and an output pattern through training and to generate, based on a result of the training, a relatively correct output value in response to an input pattern that is not used for the training.

SUMMARY

At least one example embodiment relates to a method of recognizing an object.

In at least one example embodiment, the method may include extracting a plurality of features from an input image using a single recognition model, and recognizing an object in the input image based on the extracted features.

The single recognition model may include at least one compression layer configured to compress input information of the input image, and at least one decompression layer configured to decompress the compressed information to determine the features.

The extracting of the features may include determining a plurality of areas in the input image, inputting information on the areas to the single recognition model and determining respective features of the areas using the single recognition model based on the input image.

The single recognition model may include a single input layer, and a plurality of output layers configured to output the extracted features.

The method further includes receiving information on the input image at the single input layer.

The receiving receives information on a plurality of areas in the input image at the single input layer.

The single recognition model may include a plurality of input layers, and a plurality of output layers configured to output the extracted features.

The method further includes receiving information on a plurality of areas in the input image at the input layers.

The extracting includes compressing information of correlated areas among the areas at a first compressing layer of the single recognition model, and compressing information on an entirety of the areas based on information transferred from the first compression layer.

The recognizing of the object may include determining a probability of a presence of an occlusion in a current area among the areas using the single recognition model and applying a weight to a feature of the current area, the weight being based on the determined probability.

At least one example embodiment relates to an apparatus for recognizing an object.

In at least one example embodiment, the apparatus may include a memory storing computer-executable instructions, and at least one processor configured to execute the instructions such that the processor may extract a plurality of features from an input image using a single recognition model and recognize an object in the input image based on the extracted features.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
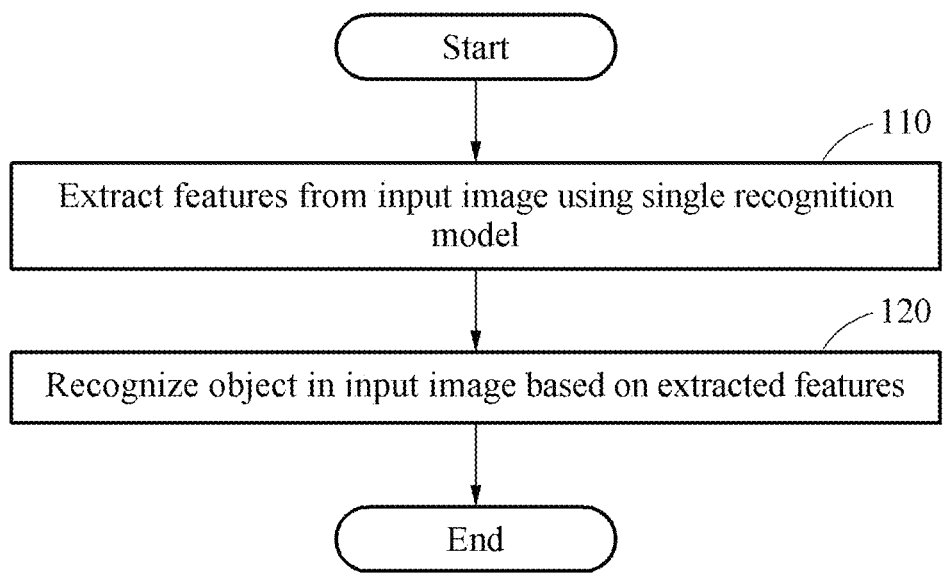
FIG. 1 is a flowchart illustrating a method of recognizing an object according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are may be encoded on some form of non-transitory computer-readable media (e.g., a volatile or non-volatile memory).

One or more example embodiments to be described hereinafter may be applicable to recognize an object from an input image. Example embodiments may be applicable to extract a plurality of features from an input image using a single recognition model in lieu of a plurality of recognition models, for example, recognizers or classifiers, and to recognize an object based on the extracted features. The recognition may include, for example, recognition of a face of a user, a scene from an image, and recognition of a fingerprint of a user from a fingerprint image.

The recognition may include verifying or identifying the object by recognizing the object (e.g., authentication). The verification may include determining whether the recognized object is a registered object, and the identification may include determining which object the recognized object corresponds to among registered objects.

Hereinafter, one or more example embodiments will be described in detail with reference to the accompanying drawings. Like reference numerals in the drawings denote like elements, and a known function or configuration will be omitted herein.

FIG. 1 is a flowchart illustrating a method of recognizing an object according to at least one example embodiment. The method of recognizing an object, which is hereinafter referred to as an object recognition method, may be performed by an apparatus for recognizing an object, which is hereinafter referred to as an object recognition apparatus.

Referring to FIG. 1, in operation 110, the object recognition apparatus extracts a plurality of features from an input image using a single recognition model. For example, the object recognition apparatus may extract a plurality of features, or interchangeably referred to as multiple features, associated with a face of a user from a face image including the face of the user, or extract multiple features associated with a fingerprint of a user from a fingerprint image including fingerprint information of the user.

The single recognition model may be, for example, based on a deep neural network including a plurality of layers. Each layer in the deep neural network may include artificial neurons based on a mathematical model, and each artificial neuron may be connected to another artificial neuron. The single recognition model may extract multiple features from input information based on a processing result from the artificial neurons. Based on an input structure of the single recognition model, the object recognition apparatus may input information on one area included in the input image to the single recognition model, or input information on a plurality of areas included in the input image to the single recognition model. The single recognition model may extract a plurality of features from the input information (e.g., a patch area of an entire face area, a zoom-in patch area and a nose patch area). A detailed description of a function and an architecture of the single recognition model will be provided with reference to FIGS. 3A through 6C.

The single recognition model may be trained in advance based on a training image. A detailed description of the training of the single recognition model will be provided with reference to FIGS. 9 through 12.

In operation 120, the object recognition apparatus recognizes an object based on the features extracted in operation 110. The object recognition apparatus may recognize a face or a fingerprint of a user, or a scene in the input image, but an object that may be recognized by the object recognition apparatus is not limited to the foregoing examples.

The object recognition apparatus may determine whether the object included in the input image is a registered object or which registered object corresponds to the object in the input image, based on multiple features output from the single recognition model. The object recognition apparatus may determine a similarity between the object included in the input image and each registered object based on the extracted features, and determine whether recognition of the object is successful or unsuccessful based on the determined similarity.

Figure 2:
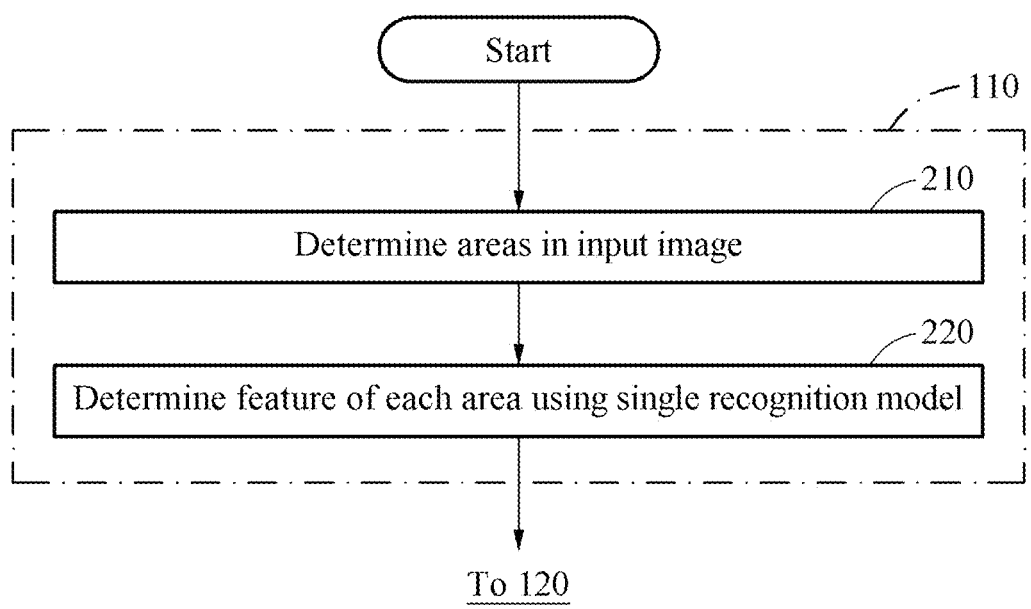
FIG. 2 is a flowchart illustrating a process of extracting a plurality of features from an input image according to at least one example embodiment.

FIG. 2 is a flowchart illustrating a process of extracting a plurality of features from an input image according to at least one example embodiment. Referring to FIG. 2, in operation 210, the object recognition apparatus determines a plurality of areas in the input image. For example, when the input image is a face image, the object recognition apparatus may determine a patch area of an entire face area in the face image, and a zoom-in patch area obtained by zooming in a certain area of the face area, for example, a zoom-in patch area of a nose. The determined areas may overlap one another in the input image.

In operation 220, the object recognition apparatus determines a feature of each of the areas using the single recognition model. The object recognition apparatus may input information on the areas determined in operation 210 to the single recognition model, and extract a feature corresponding to each of the areas from the single recognition model.

FIGS. 3A through 6C are diagrams illustrating examples of architectures of a single recognition model according to at least one example embodiment.

Figure 3A:
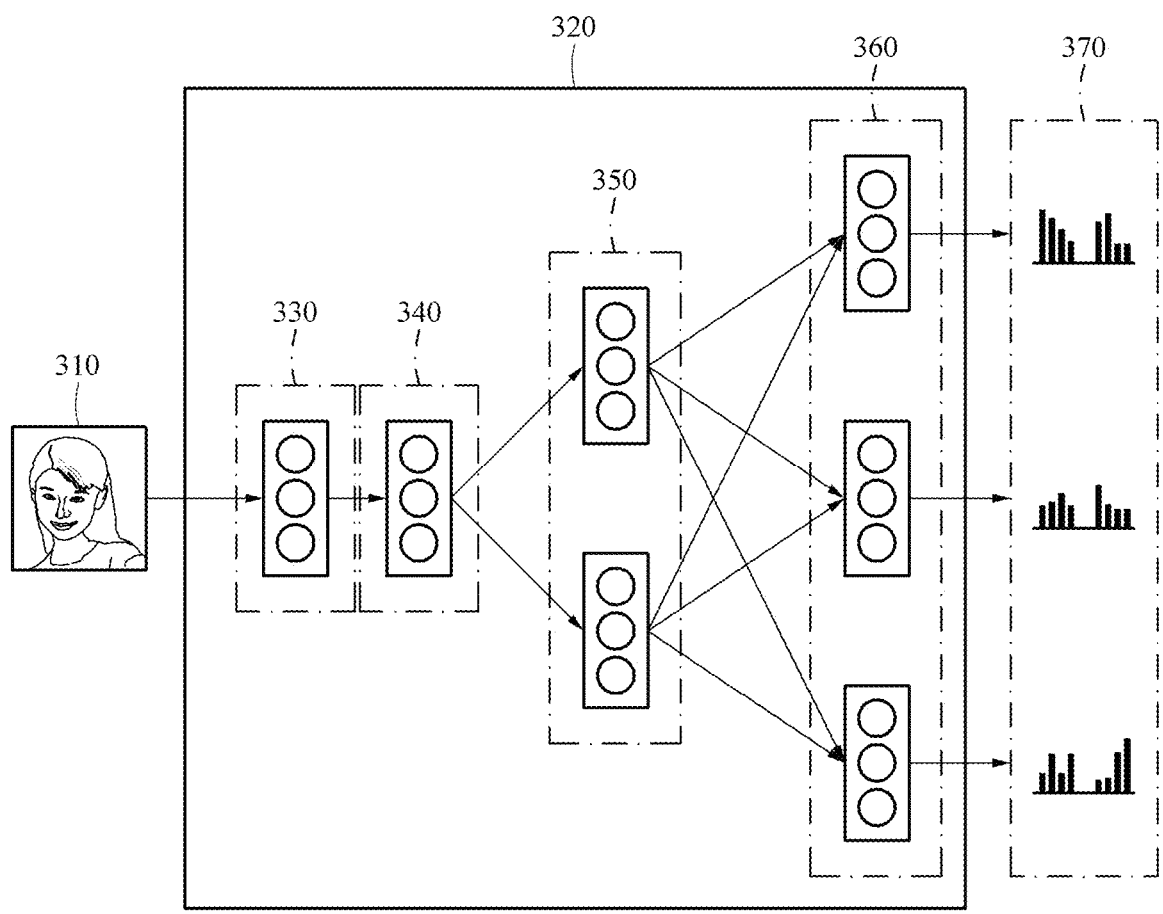
FIGS. 3A through 6C are diagrams illustrating examples of architecture of a single recognition model according to at least one example embodiment.

Referring to FIG. 3A, a single recognition model 320 is embodied in a structure of a single input and multiple feature outputs. The single recognition model 320 receives information on an input image 310 or information on one area in the input image 310, and outputs a plurality of features 370. The input image 310 used herein is assumed to be a face image. Although the information on one area in the input image 310 is input to the single recognition model 320, the single recognition model 320 may also output a feature of another area in addition to a feature of the one area.

The single recognition model 320 may be embodied in a structure in which a plurality of layers is connected, and each of the layers may include a plurality of artificial neurons. The single recognition model 320 may be implemented in hardware, a processor configured to execute software, firmware, or any combination thereof, for example. When the single recognition model 320 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the single recognition model 320. CPUs, DSPs, ASICs and FPGAs may generally be referred to as processing devices.

In the event where the single recognition model 320 is a processor executing software, the processor is configured as a special purpose machine to execute the software, stored in a storage medium (e.g., a memory), to perform the functions of the single recognition model 320. In such an embodiment, the processor may include one or more Central Processing Units (CPUs), digital signal processors (DSPs), application-specific-integrated-circuits (ASICs), field programmable gate arrays (FPGAs) computers.

As illustrated in FIG. 3A, the single recognition model 320 includes a single input layer 330 configured to receive the information on the input image 310 or the information on one area in the input image 310, a first interlayer 340 configured to transfer an output value calculated based on information transferred from the single input layer 330 to a plurality of second interlayers 350, the second interlayers 350 are configured to embody features to be output based on the output value of the first interlayer 340, and a plurality of output layers 360 are configured to output the features 370 determined based on an output value of the second interlayers 350. Here, a term "interlayer" may also be referred to as a hidden layer.

Figure 3B:
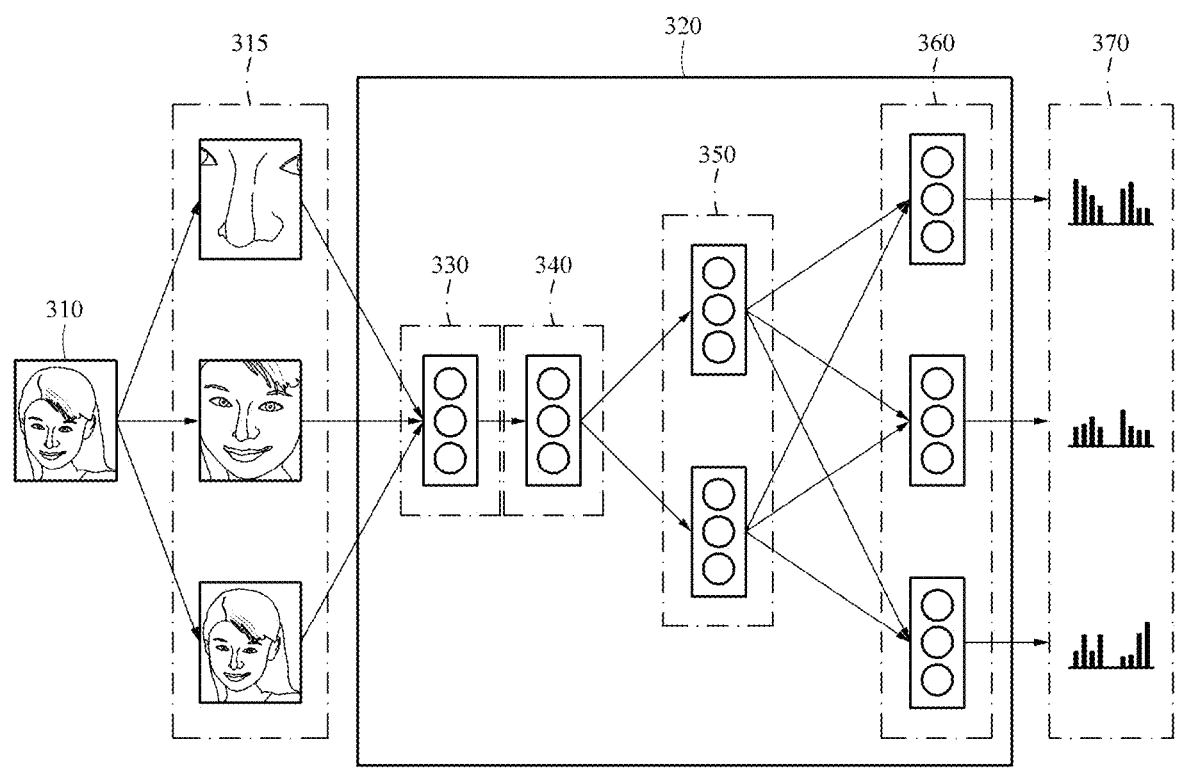

Referring to FIG. 3B, a single recognition model 320 is embodied in a structure of multiple inputs and multiple feature outputs. The object recognition apparatus determines a plurality of areas 315 in an input image 310, and extracts a plurality of features 370 from information on the areas 315 using the single recognition model 320. For example, a plurality of patch areas may be determined in the input image 310, and information on the patch areas may be input to a single input layer 330 of the single recognition model 320. The single recognition model 320 may extract the features 370 corresponding respectively to the areas 315, and the object recognition apparatus may recognize an object based on the extracted features 370 using parameters such as similarity and/or distance between features of the extracted features and registered features. For example, when information on a nose area, a zoom-in area, and an entire area is input to the single recognition model 320, the features 370 to be output from the single recognition model 320 may include a feature of the nose area, a feature of the zoom-in area, and a feature of the entire area.

Figure 3C:
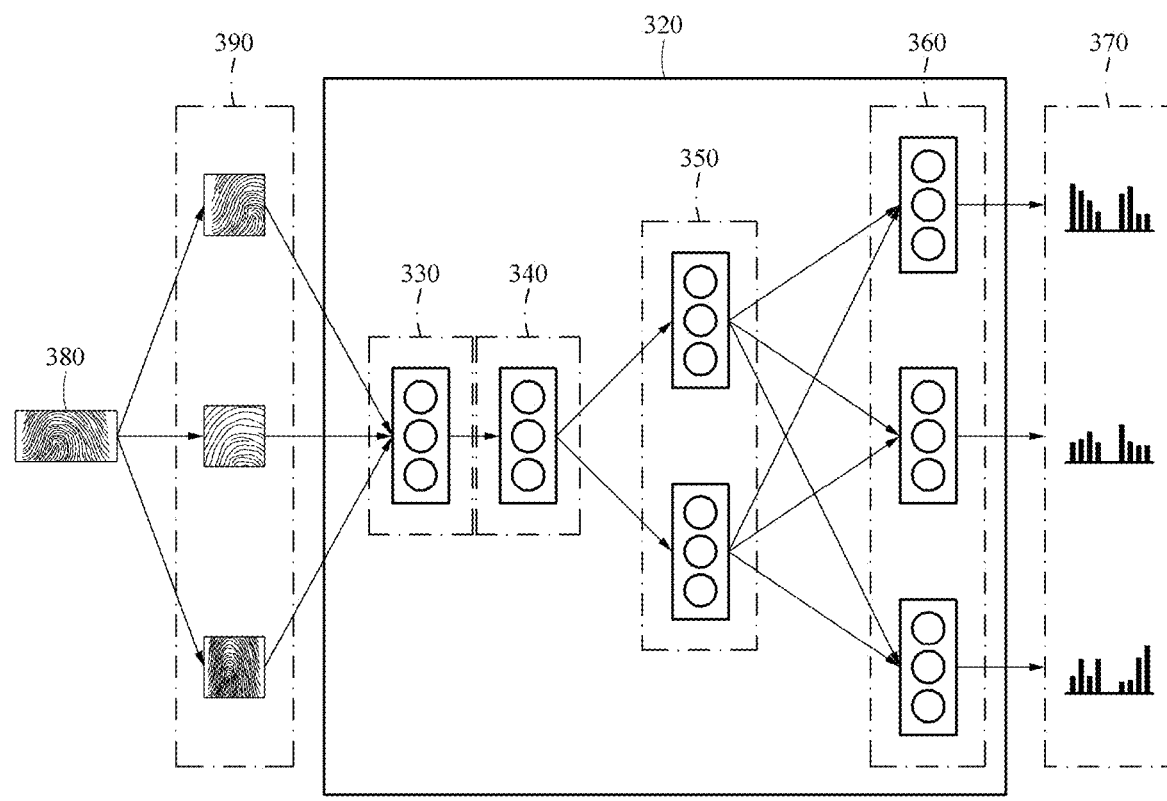

Referring to FIG. 3C, a fingerprint image 380 including fingerprint information of a user is input to a single recognition model 320. The fingerprint image 380 may be a partial image corresponding to a portion of an entire fingerprint of the user. The object recognition apparatus may determine a plurality of areas 390 in the fingerprint image 380, and input information on the determined areas 390 to the single recognition model 320. The areas 390 may be determined by a block area unit. The single recognition model 320 may extract a plurality of features 370 associated with the fingerprint information based on the fingerprint information associated with the input areas 390.

Figure 4:
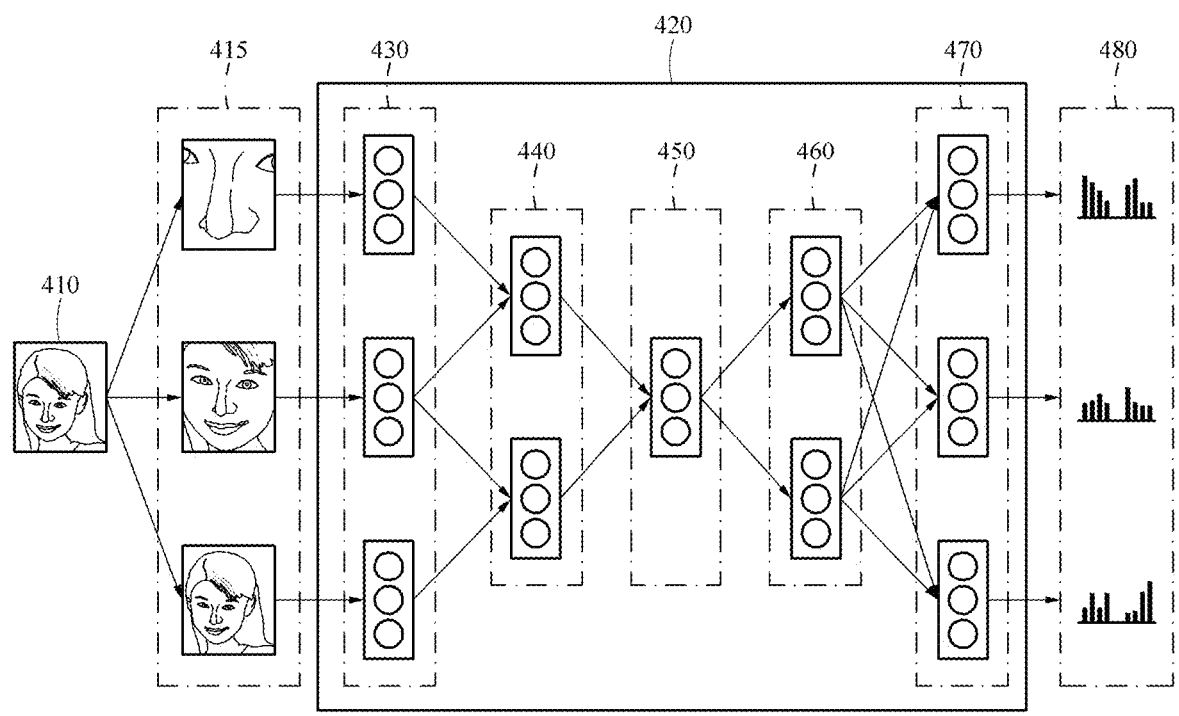

Referring to FIG. 4, a single recognition model 420 is embodied in a structure of multiple inputs and multiple feature outputs. The object recognition apparatus determines a plurality of areas 415 in an input image 410, and information on the determined areas 415 is input to the single recognition model 420. The object recognition apparatus determines respective features 480 of the areas 415 using the single recognition model 420.

The single recognition model 420 includes a plurality of input layers 430 to which the information on the areas 415 is to be input, a plurality of compression layers 440 configured to compress information output from the input layers 430, an interlayer 450 configured to transfer a result value calculated based on information output from the compression layers 440 to a plurality of decompression layers 460 and a plurality of output layers 470. The decompression layers 460 are configured to decompress information output from the interlayer 450 to determine respective features of the areas 415 and the plurality of output layers 470 are configured to output the features 480 determined based on information transferred from the decompression layers 460. In the compression layers 440, information of correlated areas among the areas 415 may be compressed. In the interlayer 450, information on an entirety of the areas 415 may be compressed based on the information transferred from the compression layers 440, and decompression may be initiated on the respective features.

Figure 5:
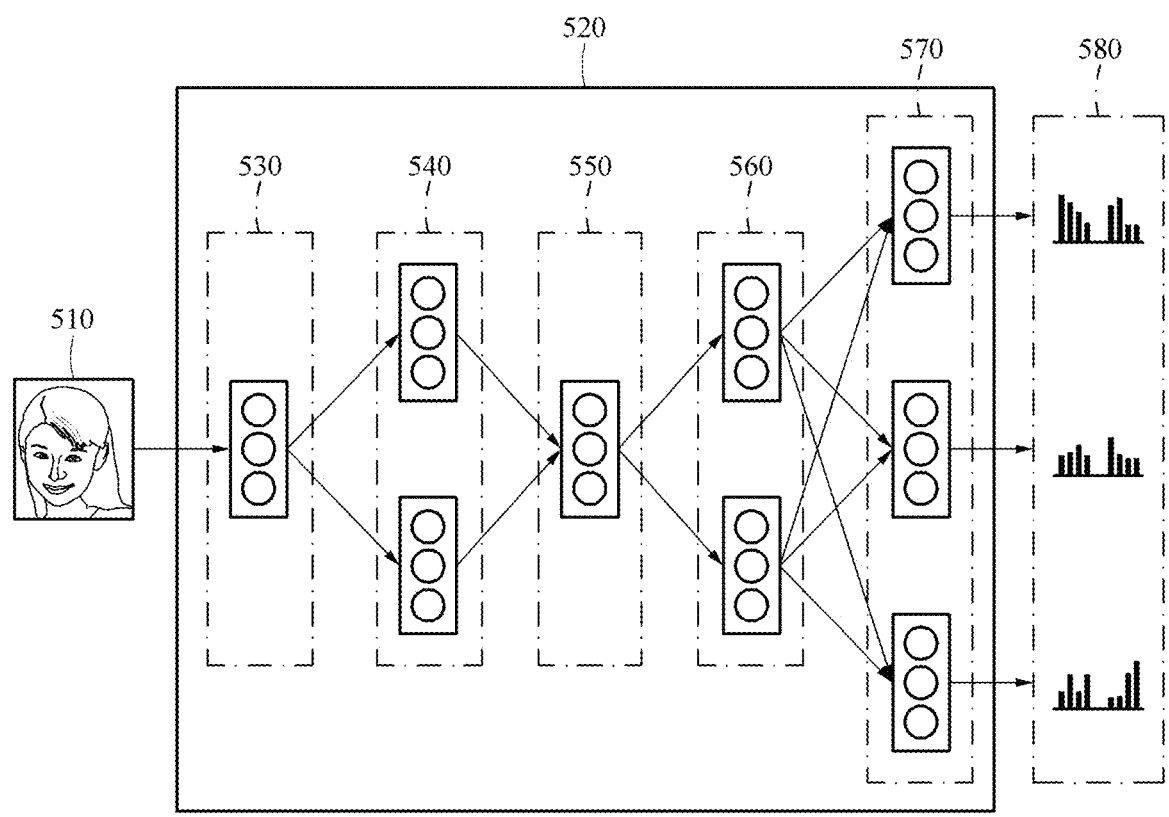

Referring to FIG. 5, a single recognition model 520 includes an input layer 530 configured to receive information on an input image 510 or information on at least one area in the input image 510, a plurality of compression layers 540 configured to compress information transferred from the input layer 530 and output the compressed information, an interlayer 550 configured to transfer a result value calculated based on information output from the compression layers 540 to a plurality of decompression layers 560 and a plurality of output layers 570. The decompression layers 560 are configured to decompress information output from the interlayer 550 to determine features and the plurality of output layers 570 are configured to output a plurality of features 580 determined based on information output from the decompression layers 560.

Figure 6A:
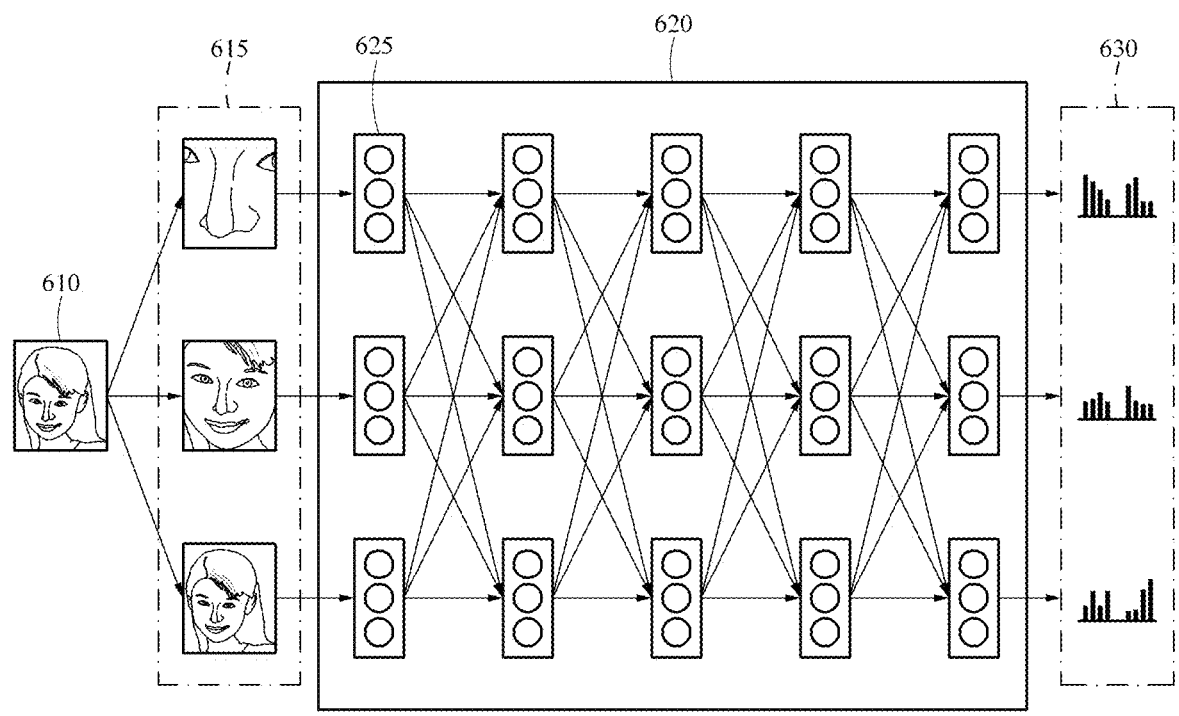
Figure 6B:
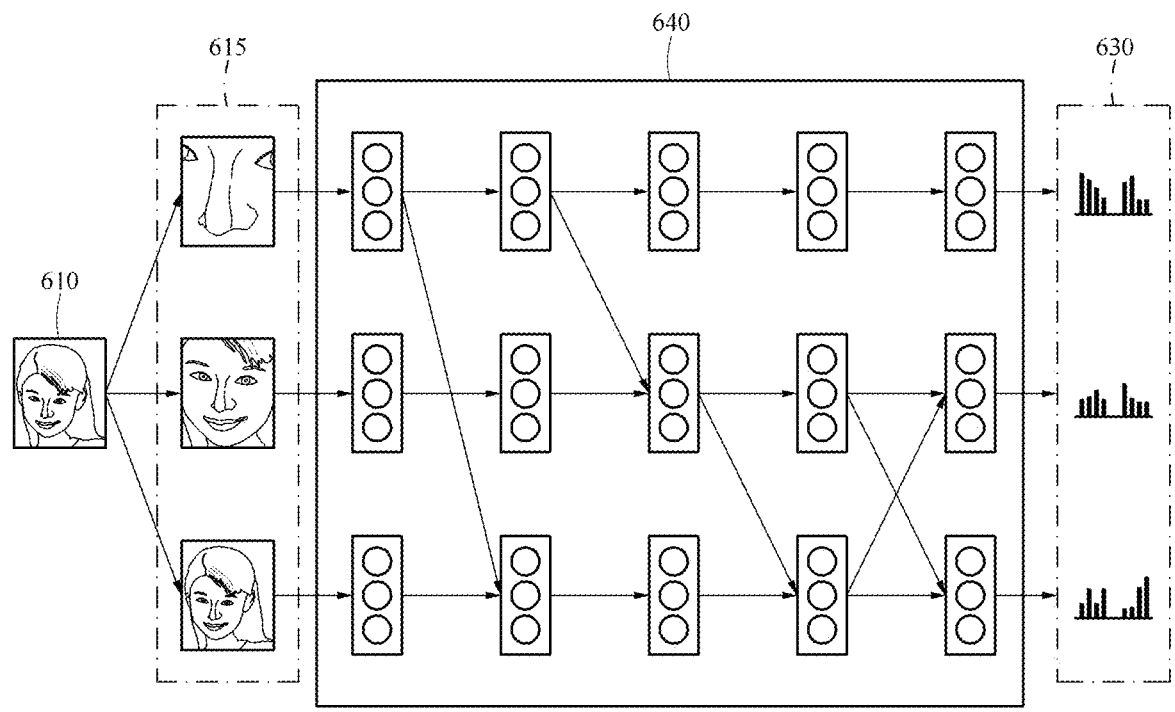

Referring to FIG. 6A, the object recognition apparatus inputs information on a plurality of areas 615 determined in an input image 610 to a single recognition model 620, and determines respective features 630 of the areas 615 using the single recognition model 620. The single recognition model 620 includes a plurality of layers 625 to determine the features 630 from the information on the areas 615, and each of the layers 625 is connected to an upper layer. The connection among the layers 625 may be relatively densely embodied as the single recognition model 620 illustrated in FIG. 6A, or relatively sparsely embodied as a single recognition model 640 illustrated in FIG. 6B.

Figure 6C:
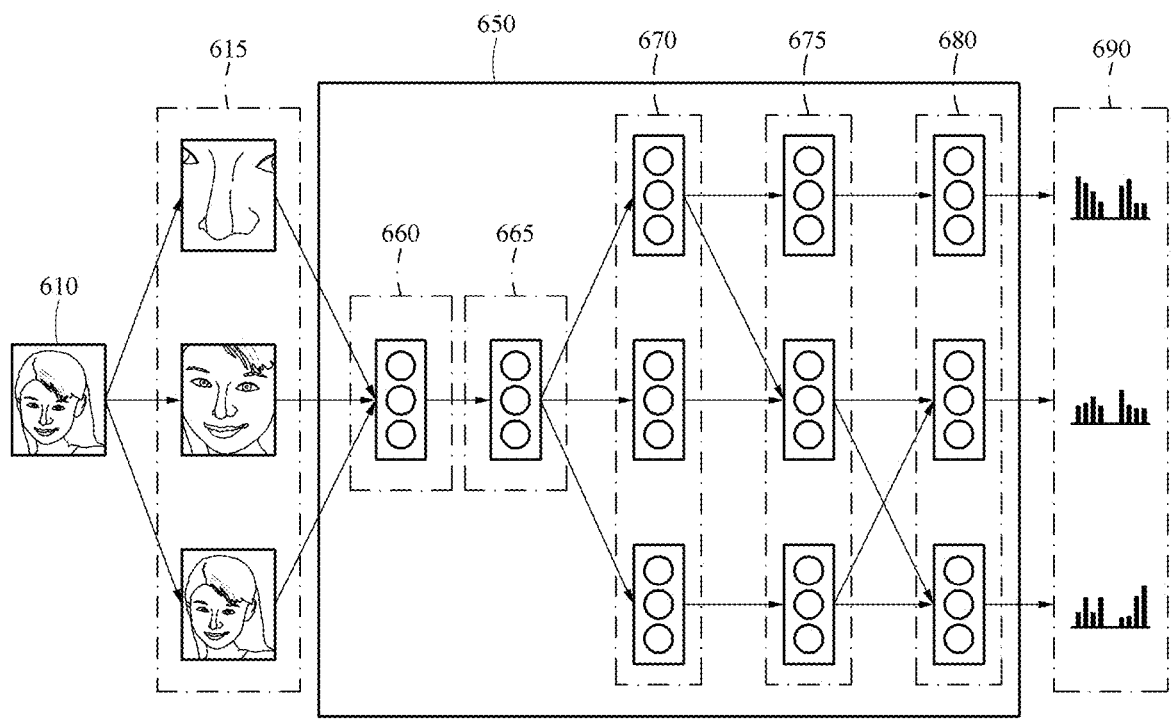

Referring to FIG. 6C, a single recognition model 650 includes an input layer 660 configured to receive information on a plurality of areas 615 determined in an input image 610, a first interlayer 665 configured to output a result value calculated based on information transferred from the input layer 660 to a plurality of second interlayers 670, the second interlayers 670 configured to output a result value calculated based on an output of the first interlayer 665 to a plurality of third interlayers 675, the third interlayers 675 configured to transfer a result value calculated based on an output of the second interlayers 670 to a plurality of output layers 680, and the output layers 680 configured to output a plurality of features 690 determined based on an output of the third interlayers 675.

Example structures of a single recognition model are described above with reference to FIGS. 3A through 6C. However, the single recognition model is not limited to the example structures illustrated in FIGS. 3A through 6C, and thus various changes or modifications may be made. For example, a connection among layers included in the single recognition model and the number of the layers are not limited to the examples illustrated in FIGS. 3A through 6C, and thus various changes or modifications may be made.

When using a plurality of independent recognition models to extract a plurality of features, an amount of calculations or operations and an amount of resources to be consumed may increase, and a recognition speed may thus decrease. However, when using a single recognition model as described above, a plurality of features similar to features obtained from the independent recognition models may be obtained and an amount of calculations or operations and an amount of resources to be consumed may be reduced without a decrease in a recognition rate, and a recognition speed may thus be improved.

Figure 7:
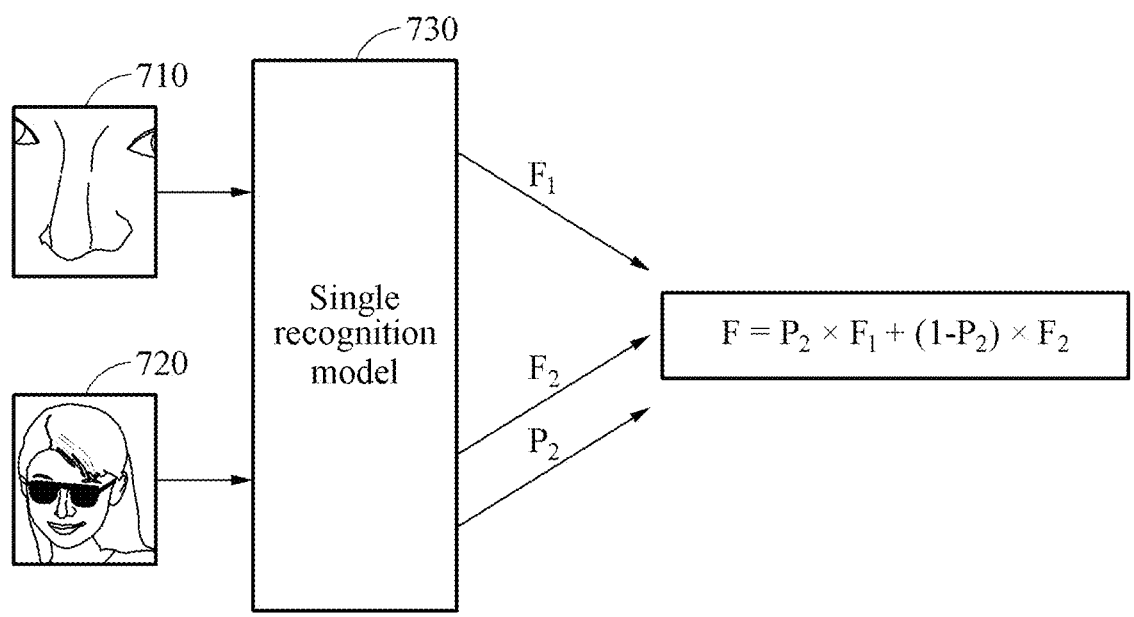
FIG. 7 is a diagram illustrating a process of determining a feature using a single recognition model in a presence of an occlusion according to at least one example embodiment.

FIG. 7 is a diagram illustrating a process of determining a feature using a single recognition model in a presence of an occlusion according to at least one example embodiment.

The object recognition apparatus may recognize an occlusion, for example, sunglasses and a mask, in an input image, and recognize an object robustly against such an occlusion. Referring to FIG. 7, it is assumed that information on a first area 710 in an input image and information on a second area 720 including an occlusion, for example, sunglasses, in the input image are input to a single recognition model 730. When the information on the first area 710 and the information on the second area 720 are input to the single recognition model 730, a feature $F_1$ of the first area 710 and a feature $F_2$ of the second area 720 may be output from the single recognition model 730, and a probability $P_2$ of a presence of the occlusion in the second area 720, for example, a magnitude, may also be output from the single recognition model 730. Here, the probability $P_2$ may be a value between zero and 1.

The object recognition apparatus may determine a weight, or a weighted value, based on the probability $P_2$ that is output from the single recognition model 730, and may apply the determined weight to the features $F_1$ and $F_2$. For example, the object recognition apparatus may apply a weight of the probability $P_2$ to the feature $F_1$, and apply a weight of $(1-P_2)$ to the feature $F_2$. When the probability $P_2$ increases, an influence of the feature $F_2$ of the second area 720 in which the occlusion is present on an entire feature F may relatively decrease. In contrast, when an influence of the feature $F_1$ of the first area 710 from which the occlusion is absent may relatively increase. Through such a process described above, although an input image including an occlusion is input, the object recognition apparatus may recognize an object robustly against the occlusion.

According to another example embodiment, the object recognition apparatus may generate an occlusion map associated with an input image, and determine an area in the input image in which an occlusion is not present using the generated occlusion map. The object recognition apparatus may input information on the area in which the occlusion is not present to the single recognition model 730 to extract features.

Figure 8:
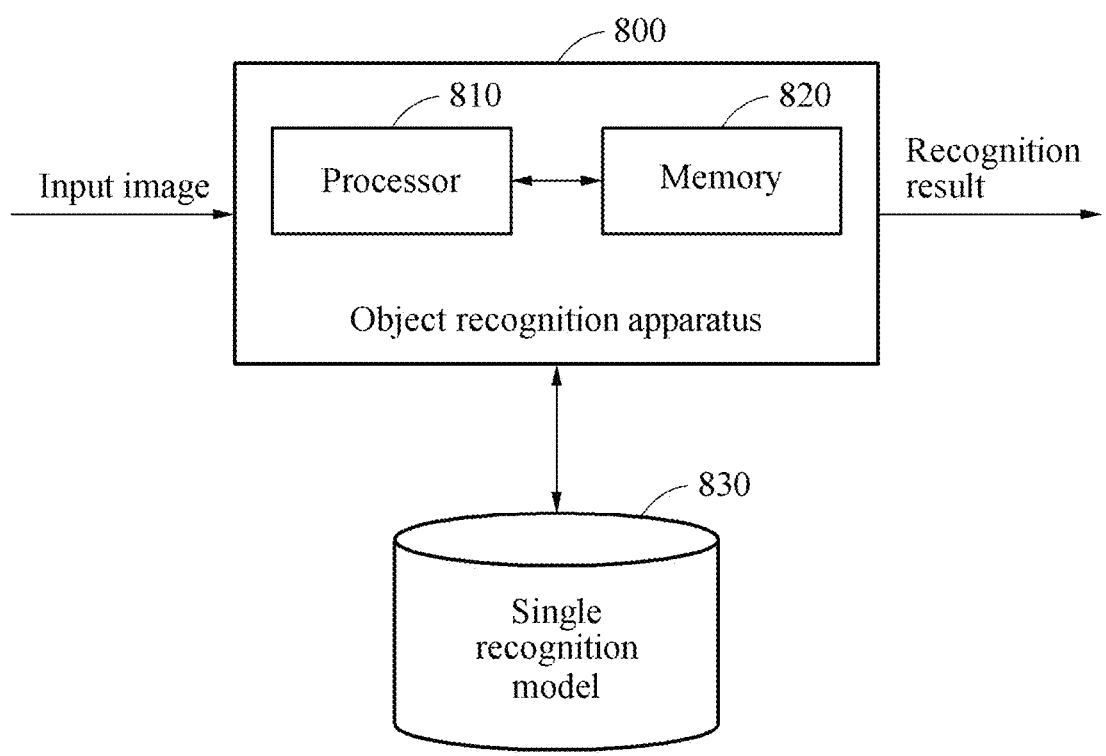
FIG. 8 is a diagram illustrating a configuration of an apparatus for recognizing an object according to at least one example embodiment.

FIG. 8 is a diagram illustrating a configuration of an object recognition apparatus 800 according to at least one example embodiment.

Referring to FIG. 8, the object recognition apparatus 800 includes a processor 810 and a memory 820. The object recognition apparatus 800 may be provided in, for example, a smartphone, a smart television (TV), a desktop computer, a laptop computer, a tablet personal computer (PC), a wearable device, an intelligent vehicle or a smart vehicle, a security system, a smart home system, and a smart home appliance.

The processor 810 may perform one or more operations described with reference to FIGS. 1 through 7. For example, the processor 810 may extract multiple features from an input image using a single recognition model 830 and recognize an object in the input image based on the extracted multiple features by executing computer-readable instructions stored in the memory 820. The processor 810 may output a recognition result through an output interface (not shown), for example, a display and a speaker. The processor 810 may be embodied as an array of logic gates, but is not limited thereto and may be embodied in another form of hardware.

The memory 820 may store the instructions to perform one or more operations described with reference to FIGS. 1 through 7 and store data and results obtained during an operation of the object recognition apparatus 800. According to at least one example embodiment, the memory 820 may include non-transitory computer-readable media, for example, a high-speed random access memory and/or non-volatile computer-readable recording media, for example, at least one disk device and flash memory device, or other nonvolatile solid state storage devices.

Figure 9:
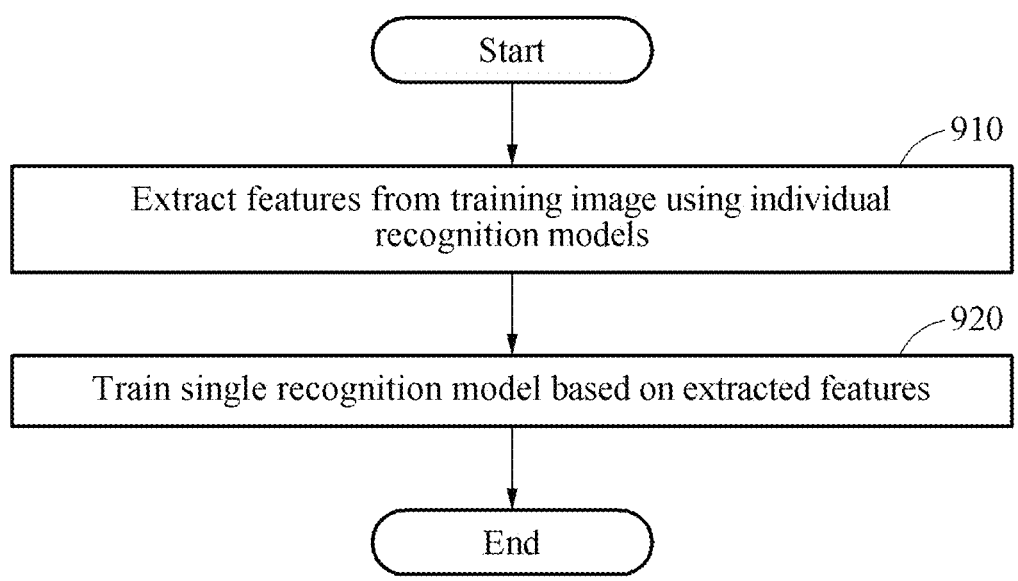
FIG. 9 is a flowchart illustrating a method of training a recognition model according to at least one example embodiment.

FIG. 9 is a flowchart illustrating a method of training a single recognition model according to at least one example embodiment.

Referring to FIG. 9, in operation 910, a training apparatus extracts a plurality of features from a training image using a plurality of individual recognition models. The training apparatus may input information on the training image or information on a plurality of areas determined in the training image to obtain the features. The training image may include, for example, a face image including a face of a user or a fingerprint image including fingerprint information of a user. A plurality of training images may be provided as the training image. In such a case, the training images may include, for example, a plurality of face images including faces of various users and a plurality of fingerprint images including pieces of fingerprint information of various users.

In operation 920, the training apparatus trains a single recognition model based on the features extracted in operation 910. The training apparatus may determine the features output, respectively, from the individual recognition models to be guide features to train the single recognition model, and train the single recognition model based on the guide features. Through the training, parameters to be applied to the single recognition model may be updated. The training apparatus may update the parameters of the single recognition model to minimize a difference between the features output from the single recognition model and the guide features determined from the individual recognition models. Through repetitive training processes, features to be output from the single recognition model may become similar to the features extracted using the individual recognition models.

A process of training the single recognition model by the training apparatus will be described in further detail with reference to FIG. 10.

Figure 10:
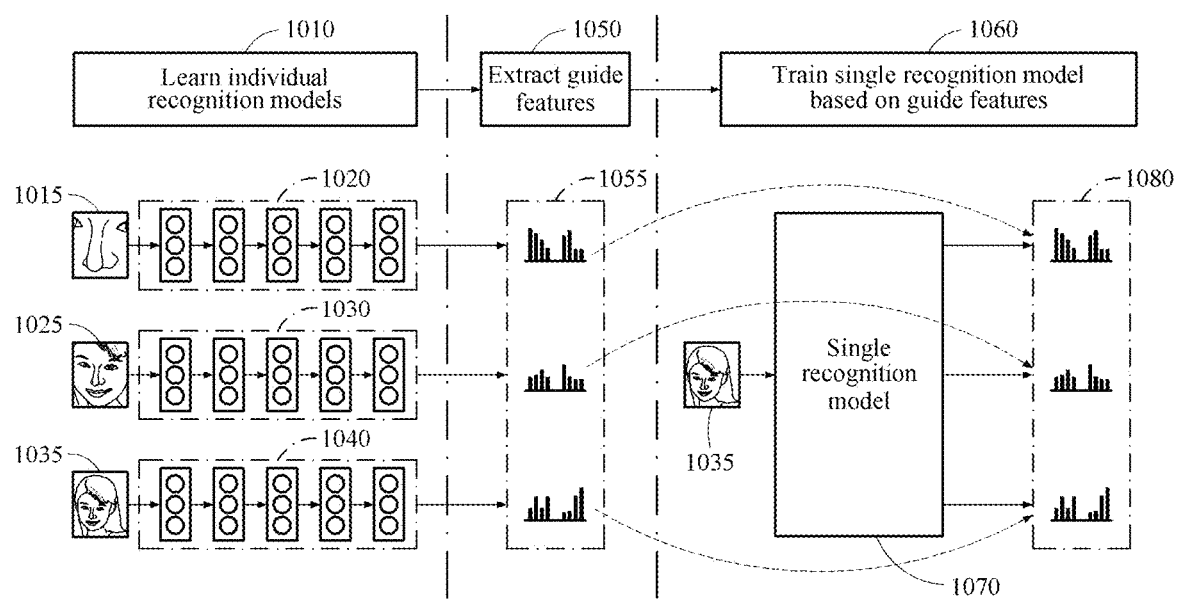
FIG. 10 is a diagram illustrating a process of training a single recognition model using a guide feature according to at least one example embodiment.

FIG. 10 is a diagram illustrating a process of training a single recognition model using a guide feature according to at least one example embodiment.

Referring to FIG. 10, in stage 1010, the training apparatus learns or trains individual recognition models, for example, a recognition model 1020, a recognition model 1030, and a recognition model 1040 for each of a plurality of areas, for example, an area 1015, an area 1025, and an area 1035, that is determined in a training image. In stage 1050, the training apparatus extracts a plurality of guide features 1055 from the learned recognition models 1020, 1030, and 1040. For example, the guide features 1055 may be features output by the recognition models 1020, 1030, and 1040 from information on the areas 1015, 1025, and 1035, respectively. The guide features 1055 may be used as a ground truth label when training a single recognition model 1070.

When training the single recognition model 1070, information on all the areas 1015, 1025, and 1035 may be input to the single recognition model 1070, or information on at least one of the areas 1015, 1025, and 1035 may be input to the single recognition model 1070. For example, when information on one area, for example, the area 1035, is input to the single recognition model 1070, the single recognition model 1070 may output respective features of other areas, for example, the areas 1015 and 1025, in addition to a feature of the area 1035, although only the information on the area 1035 is input to the single recognition model 1070.

In stage 1060, the training apparatus trains the single recognition model 1070 based on the guide features 1055. The training apparatus stores the guide features 1055 extracted from the recognition models 1020, 1030, and 1040, and then trains the single recognition model 1070, such that a plurality of features 1080 extracted from the single recognition model 1070 may become similar to the guide features 1055. Through such a training based on the guide features 1055, orthogonality among the features 1080 extracted from the single recognition model 1070 may increase.

The training apparatus may calculate a loss between the guide features 1055 and the features 1080 predicted through the single recognition model 1070. For example, the training apparatus may determine a loss function based on the guide features 1055 as represented by Equation 1 below. The loss function may be a function for calculating a difference, or an error, that may occur from the single recognition model 1070 in a current state.

$$L_{GL}(W) = \frac{1}{2T}\sum_{t} \|f(x^t, W) - z^t\|_2^2 \quad \text{[Equation 1]}$$

In Equation 1, W denotes a current parameter to be applied to each layer of the single recognition model 1070, $L_{GL}(W)$ denotes a loss function based on W and GL is an abbreviation of guide log it. T denotes the number of training images, and t denotes an index to identify the training images. $x^t$ denotes a current training image, and $z^t$ denotes guide features determined in $x^t$. f denotes a learned function approximated by the single recognition model 1070.

In addition, the training apparatus may define a loss function associated with object recognition based on a cross-entropy loss function as represented by Equation 2 below.

$$L_{ID}(w) = -\frac{1}{T}\sum_{t=1}^{T} P_t \log \hat{P}_t \quad \text{[Equation 2]}$$

In Equation 2, $P_t$ denotes a ground truth label to identify an object, and $L_{ID}(W)$ denotes a cross-entropy loss function where ID is an abbreviation of identification. T denotes the number of all training images, and t denotes an index to identify the training images. $\hat{P}_t$ denotes a prediction value determined based on features output from the single recognition model 1070.

The loss function associated with the object recognition is not limited to the examples described in the foregoing, and thus various loss functions may be used. For example, the training apparatus may define the loss function associated with the object recognition based on, for example, a hinge loss, a square loss, a softmax loss, an absolute loss, or an insensitive loss.

The training apparatus may determine an objective function L(W) based on parameters of the single recognition model 1070 as represented by Equation 3 below based on Equations 1 and 2. The training apparatus may update the parameters of the single recognition model 1070 to minimize a result value of the objective function L(W).

$$L(W) = L_{ID}(W) + \lambda \cdot L_{GL}(W) \quad \text{[Equation 3]}$$

In Equation 3, $\lambda$ denotes a weight to be applied to $L_{GL}(W)$. The training apparatus may determine parameters, W, of the single recognition model 1070 that minimize the objective function L(W), and apply the determined parameters to the single recognition model 1070. Through such a training process, the parameters of the single recognition model 1070 may be adjusted to allow the features 1080 output from the single recognition model 1070 to be similar to the guide features 1055 extracted from the recognition models 1020, 1030, and 1040, and to the single recognition model 1070 to output features that are highly related to a feature of an object in an input image.

In training individual recognition models, information on a certain area, for example, a nose, is input to a recognition model and a parameter of the recognition model is adjusted based on a result of an output feature, for example, a feature of the nose. In contrast, in training the single recognition model, although information on a certain area, for example, a nose, is input, a feature of another area is output in addition to a feature of the nose. The various output features are compared to a feature of an individual recognition model corresponding to each feature, and a parameter of the single recognition model is adjusted based on a result of the comparison.

Figure 11:
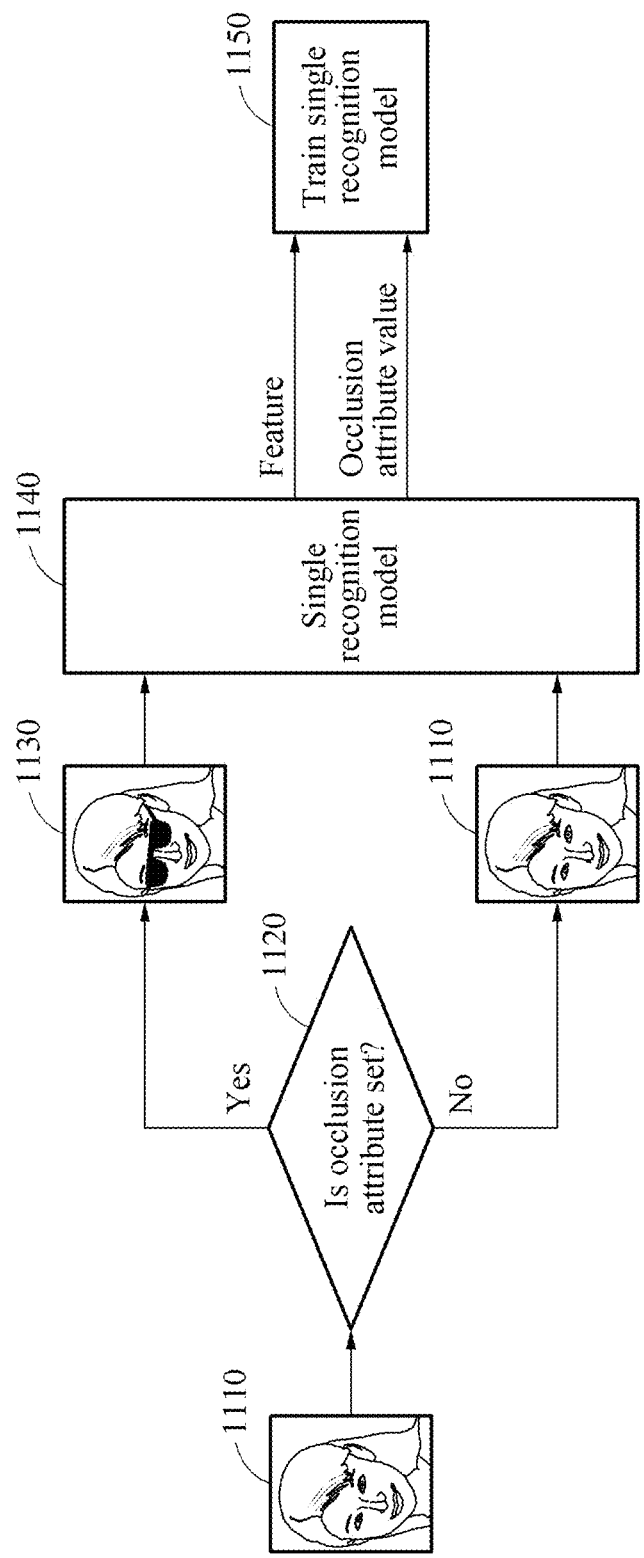
FIG. 11 is a diagram illustrating a process of training a single recognition model for an occlusion attribute according to at least one example embodiment.

FIG. 11 is a diagram illustrating a process of training a single recognition model for an occlusion attribute according to at least one example embodiment.

Referring to FIG. 11, in stage 1120, the training apparatus determines whether to set an occlusion attribute in a training image 1110 or one area in the training image 1110. For example, the training apparatus may set the occlusion attribute in the training image 1110 at a random probability.

When the training apparatus sets the occlusion attribute, the training apparatus may generate a training image 1130 including an occlusion, for example, sunglasses and a mask, by applying the occlusion attribute to the training image 1110, and the generated training image 1130 including the occlusion may be input to a single recognition model 1140. Conversely, when the training apparatus does not set the occlusion attribute, the training image 1110 is input to the single recognition model 1140. The single recognition model 1140 may output a feature and an occlusion attribute value from the training image 1110 or the training image 1130, and the training apparatus may train the single recognition model 1140 based on the feature and the occlusion attribute value in stage 1150. The occlusion attribute value may indicate whether an occlusion is present in a training image. For example, the occlusion attribute value may be indicated as 0 in an absence of the occlusion, and as 1 in a presence of the occlusion. When an occlusion is present in a training image input to the single recognition model 1140, the training apparatus may train the single recognition model 1140 to output an occlusion attribute value indicating the presence of the occlusion in the training image from the single recognition model 1140.

Figure 12:
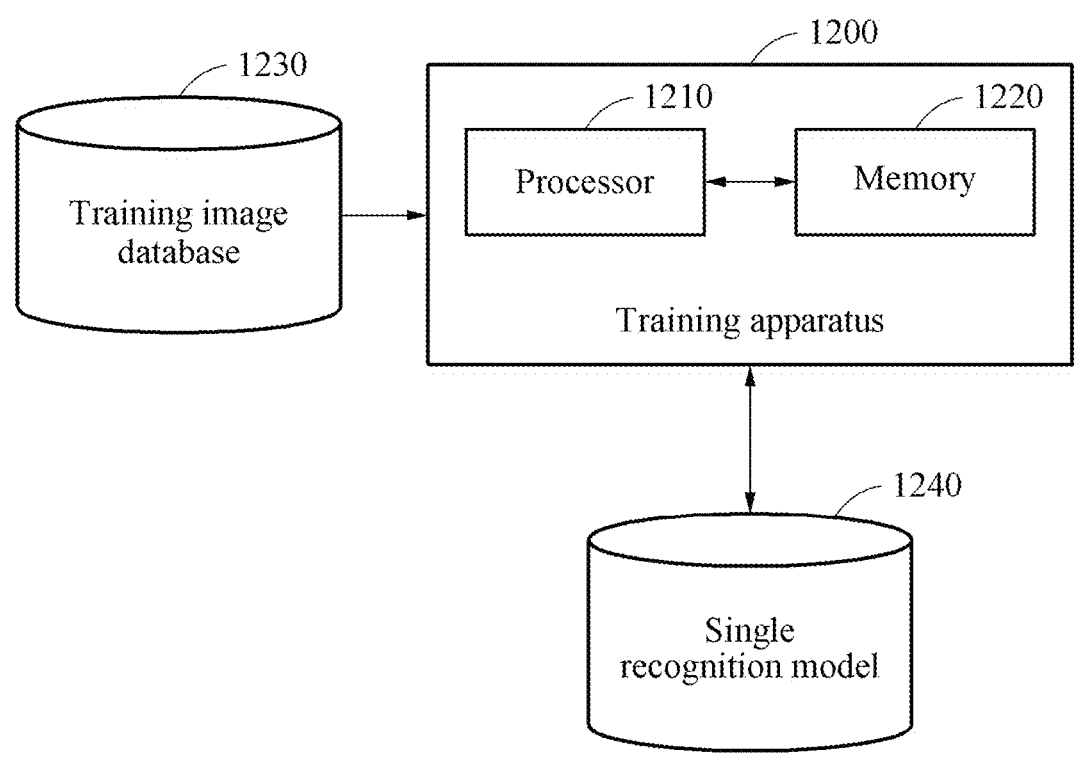
FIG. 12 is a diagram illustrating a configuration of a training apparatus according to at least one example embodiment.

FIG. 12 is a diagram illustrating a configuration of a training apparatus 1200 according to at least one example embodiment. Referring to FIG. 12, the training apparatus 1200 includes a processor 1210 and a memory 1220.

The processor 1210 may perform one or more operations described with reference to FIGS. 9 through 11. For example, the processor 1210 may train a single recognition model 1240 based on a training image included in a training image database 1230 by executing computer-readable instructions stored in the memory 1220. The processor 1210 may calculate or determine a difference between guide features obtained through individual recognition models and features output from the single recognition model 1240, and update parameters of the single recognition model 1240 to reduce the difference. The processor 1210 may be embodied as an array of logic gates, but is not limited thereto and may be embodied in another form of hardware.

The memory 1220 may store the instructions to perform one or more operations described with reference to FIGS. 9 through 11 and store data and results obtained during an operation of the training apparatus 1200. According to at least one example embodiment, the memory 1220 may include non-transitory computer-readable media, for example, a high-speed random access memory and/or non-volatile computer-readable recording media, for example, at least one disk device and flash memory device, or other nonvolatile solid state storage devices.

Figure 13:
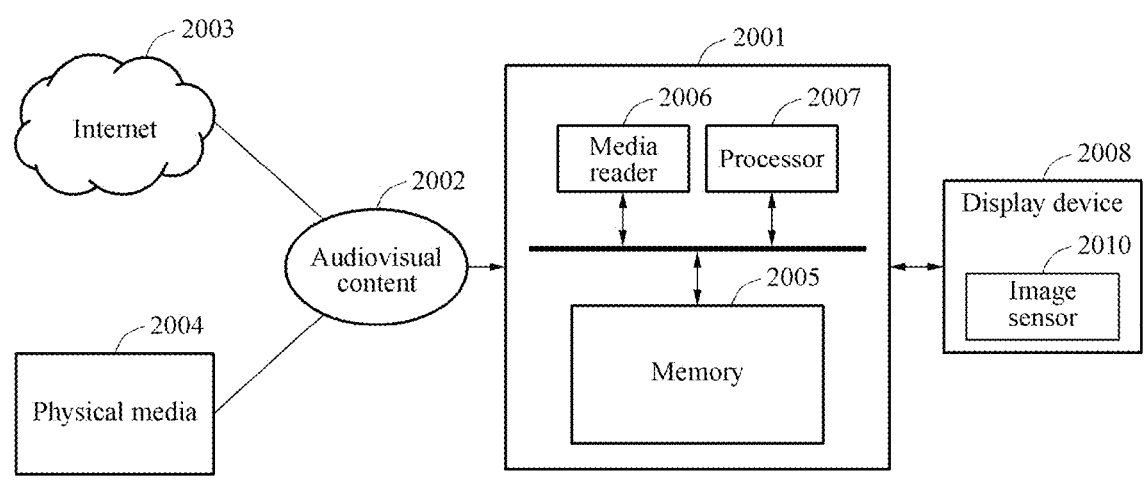
FIG. 13 illustrates an apparatus for recognizing an object in a system for setting audiovisual content according to at least one example embodiment.

FIG. 13 illustrates an apparatus for recognizing an object in a system for setting audiovisual content according to at least one example embodiment.

As shown in FIG. 13, a receiver 2001 receives audiovisual content 2002. The audiovisual content 2002 may be stored on a server linked to the receiver via a network 203 (e.g., Internet). The receiver comprises a memory 2005. This memory 2005 is able to store the received audiovisual content 2002. The audiovisual content 2002 may be also stored on a physical media 2004 (e.g., Blu-ray disc). The receiver 2001 includes a processor 2007 which is configured, upon receiving of an adequate set of instructions stored on the memory 2005, to decode the audiovisual content 2002 before rendering it. Optionally, the receiver 2001 comprises a media reader 2006 adapted to read the audiovisual content 2002 stored on the physical media 2004 (e.g., Blu-Ray reader). The memory 2005 also stores computer-readable instructions for the processor 2007 to perform the functions of an apparatus for recognizing an object, as described in FIGS. 1-8. The system comprises means for rendering the audiovisual content 2002, for example, a display device 2008. The display device 2008 includes an image sensor 2010. The image sensor 2010 obtains an image of a user using the display device 2008. Moreover, the processor 2007 and the image sensor 2010 may form the apparatus for recognizing an object. The processor 1007 performs the functions of the apparatus for recognizing an object and those described with reference to FIGS. 1-8 by executing computer-readable instructions stored in the memory 2005.

The audiovisual content 2002 contains frames associated with a watching level. A watching level is an indication indicating how offensive a part of the audiovisual content 2002 such as a violence level. The watching level may be based on the images of the audiovisual content 2002, on the audio part, on the text of subtitles, or any combination of them. The watching level may for example take the form of, on one side, the category of the offensive content (for example violence, sex, horror), and on another side, a value associated to this category (this may be for example a value comprised between 1 and 10: the greater this value is, the more offensive according to the chosen category the associated content is).

The audiovisual content 2002 may contain audiovisual segments and/or frames respectively associated with watching levels; both frames and segments are supposed to be representative of a degree of offensiveness of part or whole of the audiovisual content 2002. The watching level may be a part of the metadata of the audiovisual content 2002. It may also be manually annotated very early in the process of producing the audiovisual content 2002. The segments or the frames may be also associated with watching levels in an automated manner. If the watching level corresponds to a violence scale for example, then audiovisual segments and/or frames related to violent scenes, and/or frames will be detected and graded according to the violence scale. Methods and techniques allowing such detections are known and can be found for example in Gong et al., Detecting Violent Scenes in Movies by Auditory and Visual Cues, 9th Pacific Rim Conference on Multimedia, NatlCheng Kung Univ. Tainan TAIWAN, Dec. 9-13, 2008, pp. 317-326, the entire contents of which are hereby incorporated by reference.

Once the audiovisual content 2002 is received by the receiver 2001, the processor 2007 executes instructions stored on the memory 2005. Once the processor 2007 has analyzed the audiovisual content 2002, at least two frames, each being respectively associated with a watching level, are permitted to be displayed on the display device 2008. The processor 2007 then chooses which frame to display that corresponds to an authenticated user (e.g., a registered user) using the display device 2008. The user is authenticated by the apparatus for recognizing an object using the single recognition model, as described with respect to FIGS. 1-8.

More specifically, the memory 2005 stores desired watching levels associated with authenticated users. The processor 2007 selects a frame such that the watching level associated with the selected frame does not exceed the desired watching levels associated with the authenticated user using the display device 2008.

Figure 14:
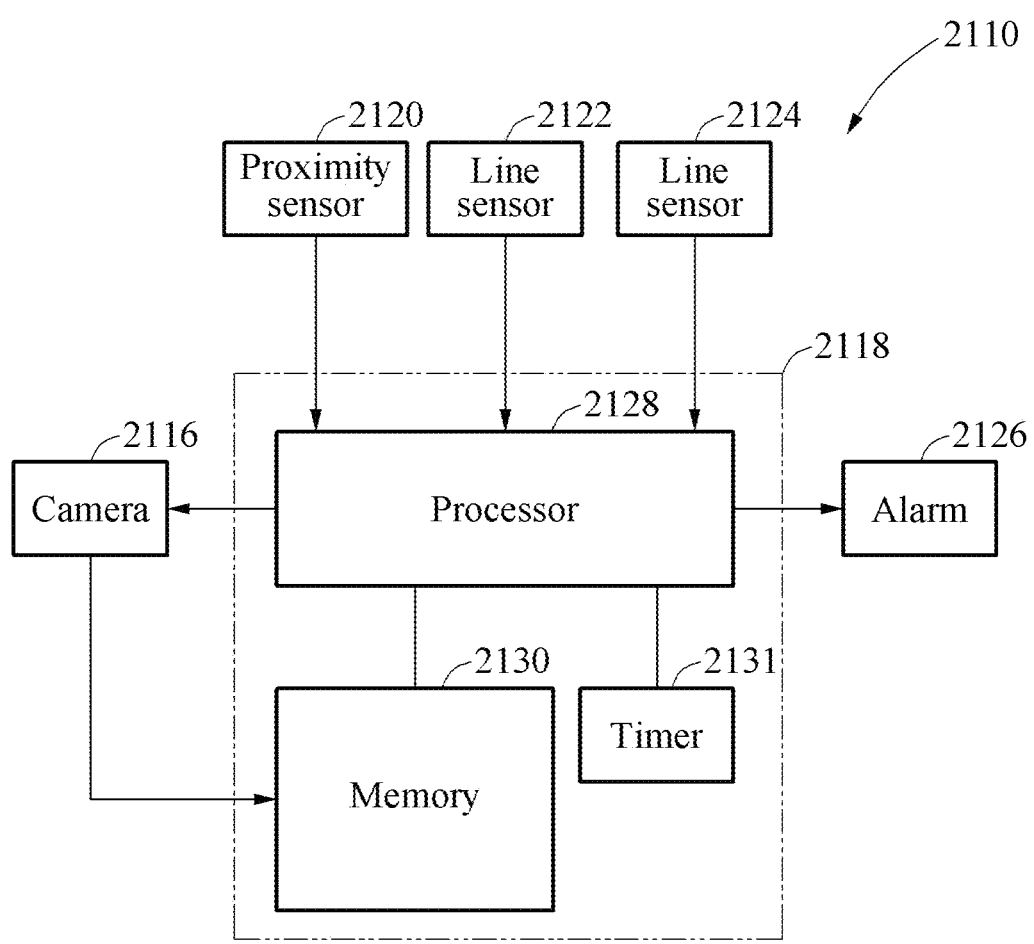
FIG. 14 illustrates an apparatus for recognizing an object in a system for enforcing parking according to at least one example embodiment.

FIG. 14 illustrates an apparatus for recognizing an object in a system for enforcing parking according to at least one example embodiment.

As shown in FIG. 14, a system for parking spot enforcement 2110 uses the apparatus for recognizing an object (e.g., a processor 2128, a camera 2116 and a memory 2130) and a proximity sensor 2120 (e.g., one or more ultrasonic sensors) for detecting entry of a vehicle within a parking space or a parking spot designated for use by disabled people or a reserved parking spot and for authenticating a driver or passenger of the vehicle. The processor 2128 performs the functions of the apparatus for recognizing an object and those described with reference to FIGS. 1-8 by executing computer-readable instructions stored in the memory 2130.

An alarm 2126 is also positioned adjacent the parking spot, and the alarm 2126 is actuated for a pre-set period of time, such as 30 seconds, for example, if the driver and/or passenger is not authenticated. The alarm 2126 can be any suitable type of alarm, such as an audio alarm, such as generating an alert by a speaker, or a visual alarm, such as generating a visual alert by a light source, or a combination thereof. A camera 2116 is also positioned adjacent the parking spot for capturing a photographic image of the driver and/or passenger.

It should be understood that any of various suitable types of cameras can be utilized and/or various types of visual sensors or image sensors can also be utilized in this regard, for example. The alarm 2126, the camera 2116, the proximity sensor 2120, and line sensors 2122, 2124 (to be described below) are each in electrical communication with a controller 2118.

The picture taken by the camera 2116 is used by the processor 2128 and the memory 2130 to authenticate the driver and/or passenger as described above with reference to FIGS. 1-8. Additionally, the line sensors 2122, 2124 are provided for detecting if the vehicle is properly parked within the designated boundaries of the parking space or parking. If the vehicle is parked over one of the line markings (i.e., partially parked in an adjacent space), then the alarm 2126 can be actuated, for example.

It should be understood that the proximity sensor 2120 and the line sensors 2122, 2124 can be any of various suitable types of sensors for detecting the presence of the vehicle.

Figure 15:
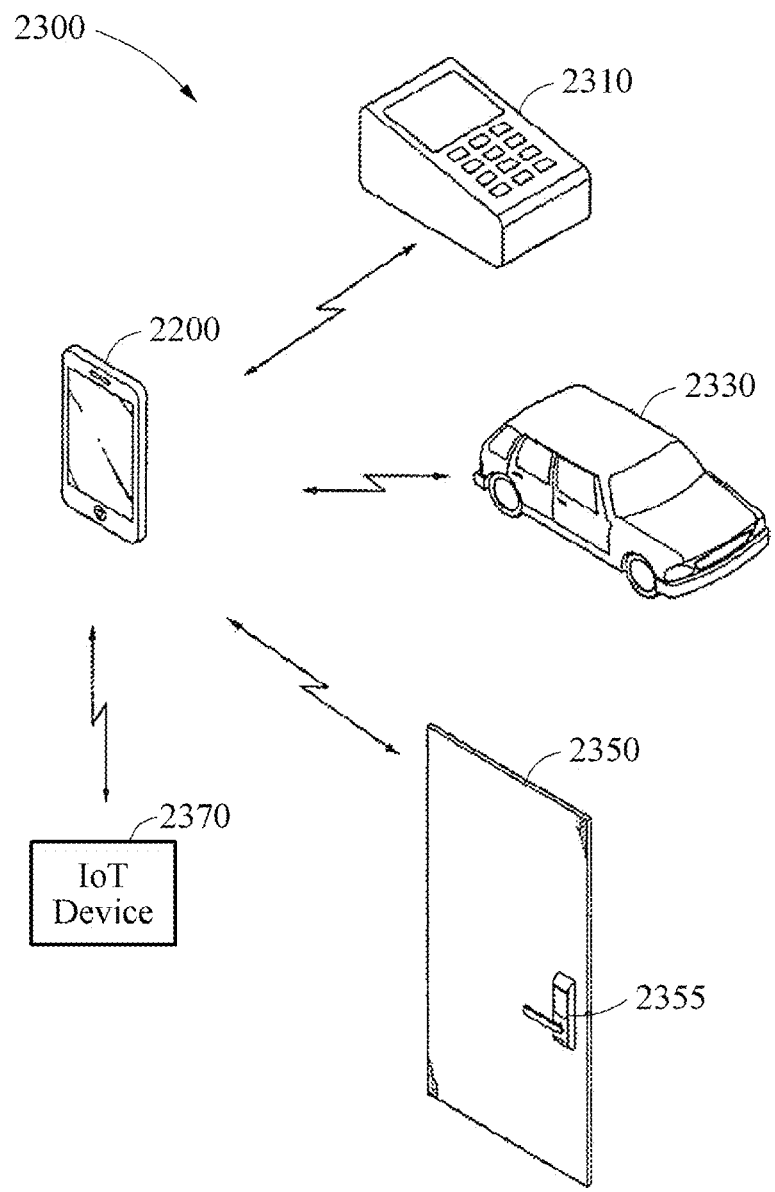
FIG. 15 is a diagram of an authentication system including an apparatus for recognizing an object according to at least one example embodiment.

FIG. 15 is a diagram of an authentication system 2300 including an apparatus for recognizing an object 2200. The apparatus for recognizing an object 2200 may operate in accordance with the apparatus for recognizing an object described in accordance with FIGS. 1-8. The apparatus for recognizing an object 2200 may be used as a device for mobile payment, a device for security solution, or a device for authentication solution. The apparatus for recognizing an object 2200 may communicate wireless signals with an automobile 2330, a digital door lock 2355 of a door 2350, a payment terminal 2310, and an IoT device 2370 using the wireless communication module 2240.

The processor 2220 of the apparatus for recognizing an object 2200 may execute a mobile payment application program or software stored in a memory. User payment information for mobile payment may safely be stored in a secure area of the memory 2230 according to the control of the processor 2220. At this time, the user payment information may be encoded and stored in the secure area of the memory.

The mobile payment application program may perform mobile payment in association with the payment terminal 2310 using the user payment information stored in the secure area of the memory. The user payment information may include identification information (e.g., credit card information, password, and registered images) by which an authentic user of the apparatus for recognizing an object 2200 is identified. The identification information may be registered in the secure area of the memory by the authentic user of the apparatus for recognizing an object 2200 using the mobile payment application program.

Figure 16:
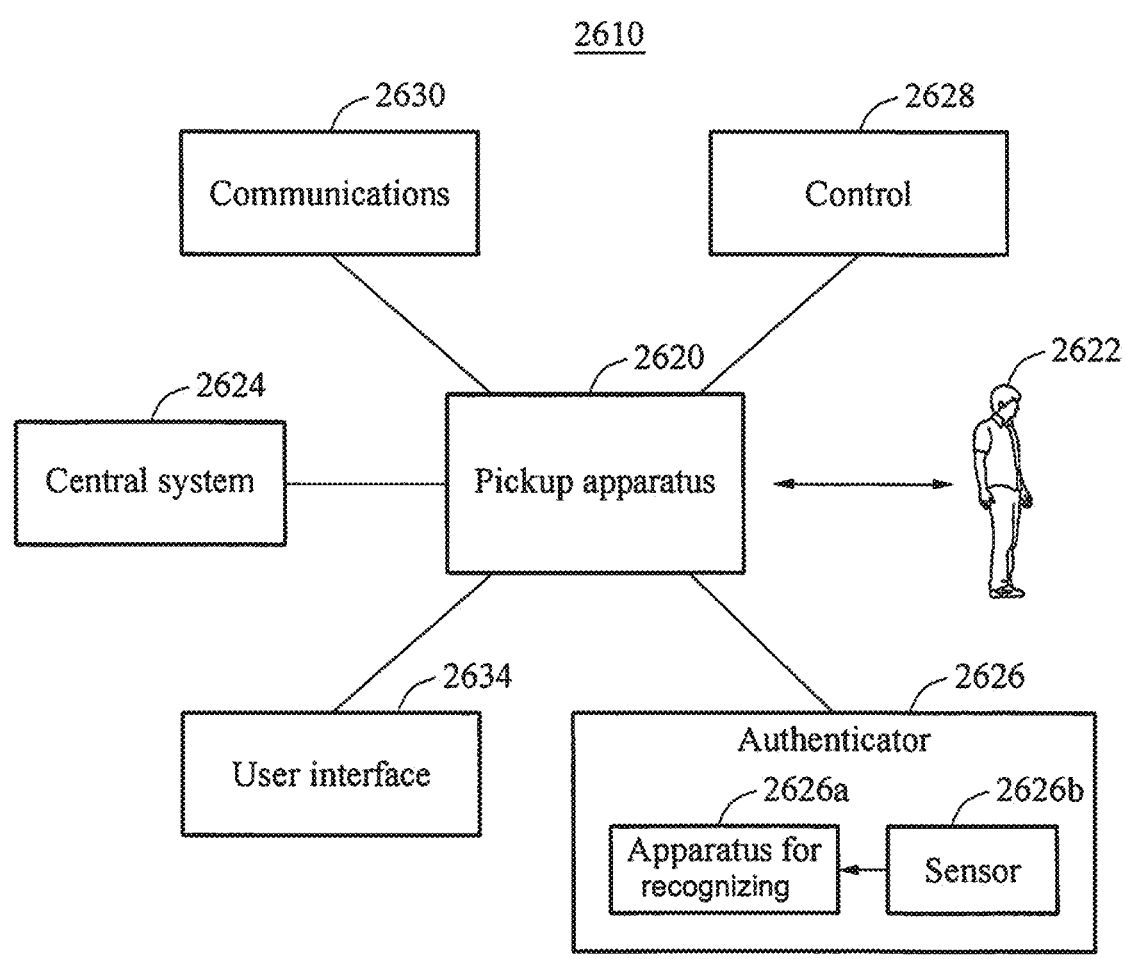
FIG. 16 illustrates a diagram of a user service system according to at least one example embodiment.

FIG. 16 illustrates a diagram of a user service system according to at least one example embodiment.

FIG. 16 shows an example embodiment of a user service system 2610. The system 2610 includes a pickup apparatus, such as a locker cabinet 2620, serving a user 2622. Coupled to the cabinet 2620 is a user interface 2634 and an authenticator 2626. The authenticator 2626 authenticates the user 2622 using an apparatus for recognizing an object 2626a, as described in FIGS. 1-8. In FIG. 16, the authenticator 2626 may include a sensor 2626b (e.g., fingerprint sensor and/or image sensor) for generating an input image and the apparatus for recognizing the object 2626a.

A controller 2628 is also coupled to the cabinet 2620, along with an optional communication module 2630. A delivery service provider delivers and receives delivery items to and from cabinet 2620.

Example embodiments for the service mechanism are described as locker systems including the cabinet 2620. However, other embodiments can include kiosks, vending machines, drones or service machines. For example, embodiments can include shipping centers, clothing stores, beverage stores, general vending machines, copy machines, and the like, and combinations thereof. When the pickup apparatus is a drone, the authenticator 2626 may be included in the drone.

The cabinet 2620 may be accessed by users and delivery service providers to deliver and retrieve items to and from secure lockers, or "cells," in the cabinet 2620. Items can include parcels, letters, periodicals, and the like. The delivery service provider can leave a specific item for a specific user in a specific cell. The cell can be manually or electronically locked. The cell can be accessed by those having approved access, such as users, or delivery service providers. Those that have approved access, such as users, or delivery service providers are authenticated by the authenticator 2626.

Delivery service providers may either drop off or retrieve items using the authenticator 2626. A user also may either drop off or retrieve items. A user may gain access to cells of the cabinet 2620 using the authenticator 2626.

A central computer system 2624 may also connect and interact with the locker system. The central computer system 2624 may be operated by a company, such as a delivery service provider, a vending company, or any other business or entity. The central computer system 2624 can operate the system 2610 if needed, such as by controlling cameras, microphones, cells, monitors, and other components included in or related to the system 2610. The central computer system 2624 can send and receive instructions to and from the system 2610, and vice versa. The central computer system 2624 can also interact and communicate with entities that communicate with the cabinet 2620, such as users and delivery service providers.

Each of the controller 2628 and the central computer system 2624 may be implemented in hardware, a processor configured to execute software, firmware, or any combination thereof, for example. When at least one of the controller 2628 and the central computer system 2624 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the controller 2628 and the central computer system 2624.

In the event where at least one of the controller 2628 and the central computer system 2624 is a processor executing software, the processor is configured as a special purpose machine to execute the software, stored in a storage medium, to perform the functions of the at least one of the controller 2628 and the central computer system 2624. In such an embodiment, the processor may include one or more Central Processing Units (CPUs), digital signal processors (DSPs), application-specific-integrated-circuits (ASICs), field programmable gate arrays (FPGAs) computers.

The units and/or modules described herein may be implemented using hardware components and hardware executing software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of recognizing an object, the method comprising:
   determining a first area and a second area in an input image, each of the first area and the second area covering a different sized area of the input image;
   inputting information on the first area and the second area to a single recognition model;
   extracting respective features of the first area and the second area using the single recognition model; and
   recognizing an object in the input image based on the respective features, wherein
   the single recognition model includes a plurality of input layers, the plurality of input layers including a first input layer and a second input layer, and
   the information on the first area is inputted to the first input layer of the single recognition model and the information on the second area is inputted to the second input layer of the single recognition model.

2. The method of claim 1, wherein the second area of the input image is within the first area of the input image.

3. The method of claim 2, wherein the first area is an entire face are and the second area is a zoom-in area.

4. The method of claim 1, wherein determining comprises determining a third area of the input image,
   the third area is a zoom-in area of the second area,
   information on the third area inputted to a third input layer of the single recognition model.

5. The method of claim 4, wherein the third area is a nose area.

6. The method of claim 1, wherein the single recognition model comprises:
   at least one compression layer configured to compress the information on the first area and the information on the second area; and
   at least one decompression layer configured to decompress the compressed information to determine the respective features.

7. The method of claim 1, wherein the single recognition model comprises:
   a plurality of output layers configured to output the extracted features.

8. The method of claim 1, wherein the recognizing of the object comprises:
   determining a probability of a presence of an occlusion in a current area of the input image using the single recognition model; and
   applying a weight to a feature of the current area, the weight being determined based on the determined probability.

9. The method of claim 1, wherein the single recognition model is a model trained based on recognition results of respective recognition models associated with features of the input image.

10. The method of claim 1, wherein the input image is a face image.

11. A computer program embodied on a non-transitory computer readable medium, when executed by a processor, configured to cause the processor to perform the method of claim 1.

12. An apparatus for recognizing an object, the apparatus comprising:
   a memory storing computer-executable instructions; and
   at least one processor configured to execute the instructions to cause the apparatus to,
   determine a first area and a second area in an input image, each of the first area and the second area covering a different sized area of the input image,
   input information on the first area to a first input layer of a single recognition model and input information on the second area to a second input layer of the single recognition model,
   extract respective features of the first area and the second area using the single recognition model, and
   recognize an object in the input image based on the respective features, wherein
   the single recognition model includes a plurality of input layers, the plurality of input layers including the first input layer and the second input layer.

13. The apparatus of claim 12, wherein the second area of the input image is within the first area of the input image.

14. The apparatus of claim 13, wherein the first area is an entire face are and the second area is a zoom-in area.

15. The apparatus of claim 12, wherein the at least one processor further configured to determine a third area of the input image,
   the third area is a zoom-in area of the second area,
   information on the third area inputted to a third input layer of the single recognition model.

16. The apparatus of claim 15, wherein the third area is a nose area.

17. The apparatus of claim 12, wherein the single recognition model comprises:
   at least one compression layer configured to compress the information on the first area and the information on the second area; and
   at least one decompression layer configured to decompress the compressed information to determine the respective features.

18. The apparatus of claim 12, wherein the single recognition model comprises:
   a plurality of output layers configured to output the extracted features.

19. The apparatus of claim 12, wherein the at least one processor further configured to:
   determine a probability of a presence of an occlusion in a current area of the input image using the single recognition model,
   apply a weight to a feature of the current area, the weight being determined based on the determined probability.

20. The apparatus of claim 12, wherein the single recognition model is a model trained based on recognition results of respective recognition models associated with features of the input image.

\* \* \* \* \*